US010694761B2

(12) United States Patent
Coy

(10) Patent No.: US 10,694,761 B2
(45) Date of Patent: Jun. 30, 2020

(54) CHOCOLATE MASS

(76) Inventor: Johannes Coy, Hainburg (DE)

(*) Notice: Subject to any disclaimer, the term of this patent is extended or adjusted under 35 U.S.C. 154(b) by 177 days.

(21) Appl. No.: 13/978,534

(22) PCT Filed: Dec. 15, 2011

(86) PCT No.: PCT/DE2011/002131
§ 371 (c)(1),
(2), (4) Date: Jul. 6, 2013

(87) PCT Pub. No.: WO2012/092916
PCT Pub. Date: Jul. 12, 2012

(65) Prior Publication Data
US 2013/0280357 A1 Oct. 24, 2013

(30) Foreign Application Priority Data
Jan. 6, 2011 (DE) .................. 10 2011 008 016

(51) Int. Cl.
A61K 36/00 (2006.01)
A23G 1/32 (2006.01)
A23G 1/40 (2006.01)
A23G 1/42 (2006.01)

(52) U.S. Cl.
CPC ............ A23G 1/32 (2013.01); A23G 1/40 (2013.01); A23G 1/426 (2013.01); A23V 2200/308 (2013.01); A23V 2200/328 (2013.01); A23V 2250/608 (2013.01); A23V 2250/62 (2013.01); A23V 2250/634 (2013.01); A23V 2250/636 (2013.01); A23V 2250/712 (2013.01)

(58) Field of Classification Search
None
See application file for complete search history.

(56) References Cited

U.S. PATENT DOCUMENTS

| 3,900,578 | A |   | 8/1975  | Turos |   |
|---|---|---|---|---|---|
| 5,051,408 | A | * | 9/1991  | Cooper | A61K 31/715 424/131.1 |
| 5,576,316 | A | * | 11/1996 | Cohn | A61K 31/195 514/218 |
| 6,610,699 | B2 |   | 8/2003  | Cavazza | A61K 31/205 514/283 |
| 7,202,219 | B1 | * | 4/2007  | Vigh | A61K 31/70 424/93.45 |
| 7,604,824 | B2 | * | 10/2009 | Yang | A61K 36/732 424/776 |
| 2004/0044028 | A1 | * | 3/2004  | Obukowicz | A61K 31/201 514/303 |
| 2005/0085498 | A1 | * | 4/2005  | Byrd | 514/275 |
| 2007/0122458 | A1 | * | 5/2007  | Landh et al. | 424/439 |
| 2008/0193573 | A1 | * | 8/2008  | Gow et al. | 424/756 |
| 2008/0213401 | A1 | * | 9/2008  | Smith | 424/657 |
| 2008/0255764 | A1 | * | 10/2008 | Ritchie et al. | 702/19 |
| 2008/0260925 | A1 |   | 10/2008 | Zink |   |
| 2009/0023803 | A1 | * | 1/2009  | Troplin | A61K 36/185 514/456 |
| 2009/0181461 | A1 | * | 7/2009  | Miyoshi | G01N 33/57438 436/64 |
| 2009/0209486 | A1 | * | 8/2009  | Brown | 514/54 |
| 2009/0215718 | A1 |   | 8/2009  | van Laere et al. |   |
| 2009/0221525 | A1 |   | 9/2009  | Coy et al. |   |
| 2010/0021533 | A1 | * | 1/2010  | Mazed et al. | 424/450 |
| 2010/0261669 | A1 | * | 10/2010 | Groenendijk et al. | 514/50 |
| 2010/0286258 | A1 |   | 11/2010 | Bhaggan et al. |   |
| 2010/0303840 | A1 | * | 12/2010 | Kaddurah-Daouk et al. | 424/184.1 |
| 2011/0117180 | A1 | * | 5/2011  | Yan et al. | 424/450 |
| 2011/0306579 | A1 | * | 12/2011 | Stein | 514/167 |
| 2012/0058938 | A1 | * | 3/2012  | Hageman et al. | 514/5.2 |
| 2013/0136800 | A1 | * | 5/2013  | Hernandez et al. | 424/602 |

FOREIGN PATENT DOCUMENTS

| CN | 101077356 A   | * | 11/2007 |   |
|---|---|---|---|---|
| CN | 101422439 A   | * | 5/2009  |   |
| CN | 101822808 A   | * | 9/2010  |   |
| DE | 23 40 694     |   | 2/1974  |   |
| DE | 10 2006 014543 A1 |   | 9/2007  |   |
| EP | 1230923 A1    | * | 8/2002  |   |
| JP | 05339148 A    | * | 12/1993 |   |
| JP | 2001192342 A  | * | 7/2001  |   |
| WO | 2006/094716 A1 |  | 9/2006  |   |
| WO | WO2007035311 A2 | * | 3/2007 |   |
| WO | 2007/073187 A1 |  | 6/2007  |   |
| WO | WO-2007125823 A1 | * | 11/2007 | ........ A61K 31/352 |
| WO | WO2009051609 A1 | * | 4/2009 |   |
| WO | WO2009151394 A1 | * | 12/2009 |   |
| WO | 2010/117344 A1 |  | 10/2010 |   |

OTHER PUBLICATIONS

Vickers (A Vaccine Against Alzheimer's Disease, Drug Aging 2002:19(2) 487-494).*
Brudevold, F. [u.a.]: Enamel Demineralization Potential of Dietary Carbohydrates. In: J. Dent Res., vol. 62, 1983, Nr. 12, S. 1218-1220.—ISSN: 0005-3473.
U.S. Food and Drug Administration: GRAS Notice No. 307. Palm oil-derived tocols with tocotrienols and a-tocopherol as the principal components. Oct. 2009. URL: http://www.accessdata.fda.gov/scripts/fcn/gras notices/grn 307.pdf [accessed Jun. 5, 2011].

* cited by examiner
(Continued)

Primary Examiner — Michael Barker
Assistant Examiner — Randall Winston
(74) Attorney, Agent, or Firm — Agris & Von Natzmer, LLP; Joyce Von Natzmer

(57) ABSTRACT

The invention provides a novel chocolate mass which has a glycemic index of less than 29 (GI<29) and of which the content of added sugar comprises at least 10% galactose and in addition a content of iosmaltulose and/or tagatose. The chocolate mass additionally has a content of vitamin E in the form of a tocotrienol-tocopherol mixture from natural sources, wherein the content of tocotrienols in the chocolate mass is greater than the content of tocopherols.

24 Claims, No Drawings

CHOCOLATE MASS

This is the U.S. national stage of International application PCT/DE2011/002131, filed Dec. 15, 2011 designating the United States and claiming priority to DE 10 2011 008 016.3, filed Jan. 6, 2011.

The invention relates to a novel chocolate mass.

For decades, chocolate has been a popular luxury foodstuff among all population groups and in previous compositions has both health-promoting properties and also potentially health-damaging properties.

Chocolate is produced from the seeds of the cocoa tree, that is to say from "cocoa beans". For chocolate production, cocoa beans are normally roasted. The roasting process is carried out either before or after the removal of the bean shell (or seed shell). The cocoa seeds/cocoa beans freed from the bean shell, that is to say what is known as the broken cocoa seed or broken cocoa (or "nibs") is ground. In so doing, the cocoa butter is released and, together with the finely ground broken cocoa (seed) residues, forms the liquid cocoa mass. Depending on the further processing, either cocoa powder or chocolate is produced from this cocoa mass.

For the production of chocolate, the cocoa mass is mixed, depending on the formulation, with different quantities of cocoa butter, sugar, and possibly milk powder and other additives to form a chocolate mass.

So that the chocolate achieves the smoothest consistency possible and no longer produces a "grainy" sensation on the tongue, the chocolate mass is rolled in a refiner. The chocolate mass is then conched, tempered (that is to say cooled until the fat fraction in the chocolate forms solidification crystals) and is lastly molded into the desired shape and cooled to packing temperature.

This chocolate mass is the basic substance for chocolate goods (synonym: chocolate products) according to Annex 1, nos. 3 to 10 and 2 (c) and 2 (d) of the German Cocoa Regulation of 15 Dec. 2003 (Official Journal: BGB1. I p. 2738), last amended by Article 2 of the Regulation of 30 Sep. 2008 (Official Journal: BGB1. I p. 1911).

Most commercially available conventional chocolate masses and the chocolate goods produced therefrom, with the exception of what are known as bitter chocolates and some special chocolates, have a relatively high content of sucrose (cane sugar). Sucrose has a high glycemic index. Sugars with a high glycemic index have to, or should, be avoided in particular by patients suffering from type 2 diabetes and by patients suffering from cancer.

The current increase in the incidence of type 2 diabetes additionally underlines the need to provide foodstuffs that have a relatively low glycemic index (GI) and a relatively low glycemic load (GL) and therefore cause only a relatively low insulin output.

Cancer occurs more frequently in diabetics than in the average population. The currently high carbohydrate intake in the population of western developed nations and the increasing consumption of carbohydrate in countries such as India and China lead not only to an ever-increasing incidence of diabetes, but also of cancer.

Cancer is a multi-stage process, which, from a healthy cell, leads via a benign tumor cell to the formation of a malignant tumor cell (cancer cell). Triggers of this process include gene changes (mutations), which change the growth and mortality properties of a cell, such that said cell divides and therefore multiplies, without this being of use to the organism as a whole. As a result of the increased cell multiplication and the reduced mortality of the cells, a cell collection/cell cluster is initially produced and is referred to as a benign tumor. The benign tumor displaces the healthy surrounding tissue, without destroying it or growing into it (non-invasive growth). The benign tumors may develop into malignant tumors if their metabolism changes, specifically if they change over from burning metabolism to fermentation metabolism, more specifically even in the presence of oxygen (aerobic glycolysis or Warburg effect). A number of influences are known that trigger this changeover: oxygen shortage in relatively large tumors or in tumors having a poor supply of blood, radical loading of the tumor cell as a result of chronic inflammation, chemotherapies and radiation therapies, and anti-angiogenesis active ingredients. The lactic acid formed during fermentation metabolism destroys the surrounding tissue, such that the tumor can grow into said tissue (invasive growth), and it inhibits the attack of the immune system. The cells then growing invasively can spread in the entire body via the lymph vessel and blood vessel system and can form distance metastases (spread). Due to the interruption of the burning metabolism in the mitochondria (oxidative phosphorylation), the formation of radicals and the triggering of apoptosis are suppressed, and these cancer cells are hereby also resistant to radiation therapies and chemotherapies.

Increased consumption of easily digestible carbohydrates (in particular in the form of sugars and starch with a high glycemic index) promotes the transition of tumor cells into cancer cells, accompanied by a rise in activity of the gene TKTL1 (transketolase-like-1 gene). The TKTL1 gene products cause an oxygen-independent release of energy, which leads to no radical formation and neutralizes present or exogenously induced radicals. At the same time, the activity of the mitochondria is reduced and apoptosis (programmed cell death) is inhibited. In accordance with the current state of science, increased activity of the TKTL1 gene is causal or at least a significant reason for the production of aggressive cancer diseases.

With the evidence of the activity of the TKTL1 gene in tumor cells (for example directly in tumor cells or indirectly by evidence of the TKTL1 protein in bodily fluids or in phagocytes/macrophages), cancer patients can be identified whose illness can be mitigated or even cured by means of dietetic therapy with restriction of the carbohydrate quantity and use of sugar forms with a low glycemic index because the growth of TKTL1-positive tumors and metastases is inhibited as a result of the reduced carbohydrate and in particular glucose supply.

Since the sugar uptake in cancer cells is often also facilitated with the aid of insulin and since insulin additionally exerts a growth-promoting effect, even on cancer cells, it is in principle desirable to induce just a low insulin output after the consumption of a meal.

Besides the described conventional chocolate masses with cane sugar/sucrose as a sugar component, there are also special chocolate masses, in which the sugar component is replaced completely or for the most part by sugar substitutes/sugar alternatives or by fructose.

For example, in what are known as diabetic chocolates, either sugar alcohols (for example polyols) or fructose or both are used instead of sucrose. The sugar alcohols and also fructose indeed have a low glycemic index, but can lead to health problems. Sugar alcohols cannot be digested completely by human enzymes and are broken down in part via the intestinal flora, which often leads to gas formation, accompanied by bloating, and also to diarrhea. In the production process, fructose has the disadvantage that it is very hygroscopic, and the chocolate mass prepared therewith cannot be heated above 50° C. during conching because this would otherwise lead to fructose agglomerate formation and as a result to a grainy texture of the chocolate produced.

In human nutrition, fructose particularly has the disadvantage compared to glucose that approximately 30-40% of the population in the western world suffers from fructose malabsorption. In addition, fructose, in contrast to glucose, is only transported in an uncontrolled manner from the intestine into the cells, merely due to its concentration gradient. With high fructose quantities in food, health problems such as osmotic diarrhea, serotonin deficiency (as a result of chemical reactions of fructose with tryptophan in the intestine) or increased uric acid production (as a result of increased fructose-1-phosphate formation in the liver) may therefore occur.

In what are known as "teeth-friendly chocolates" (International Sweets and Biscuits Fair (ISM) 2009, Cologne, Hall 10.2, Stand E78), which have recently been introduced, the disaccharide isomaltulose is used. Isomaltulose is a sugar occurring in honey and sugar cane and can be produced from sucrose. Similarly to sucrose, isomaltulose consists of the two monosaccharides glucose and fructose and has a similar, but reduced, sweet profile. Due to a more stable molecular bond between the glucose and fructose molecule compared to sucrose, isomaltulose cannot be cleaved by the plaque bacteria in the human mouth, which is why no teeth-damaging acids can be produced in the mouth when isomaltulose is consumed.

The object of the present invention is therefore to provide a novel chocolate mass, in particular for the production of chocolate goods according to Annex 1 of the German Cocoa Regulation of 15 Dec. 2003 (Official Journal: BGB1. I p. 2738), of which the sugar component has a relatively low glycemic index (GI) and a relatively low glycemic load (GL), and which, when consumed, causes only a relatively low insulin output, but is comparable in terms of taste and consistency to the known chocolate goods, and which has no undesirable side effects, in particular causes no indigestion problems or other adverse effects on health or does not cause the consumer to feel unwell.

A solution to this problem lies in a chocolate mass having a content of cocoa mass and a content of added sugars, said chocolate mass being characterized in that the added sugars have a glycemic index of less than 35 (G<35) in each case, in that the content of added sugars on the whole and the chocolate mass on the whole have a glycemic index of less than 29 (GI<29), in that the added sugars comprise a fraction of galactose that represents at least 10% of the content of added sugars on the whole and that is higher than a fraction, which may or may not be present, of lactose, in that the added sugars additionally comprise a content of isomaltulose and/or tagatose and/or trehalose and/or ribose, in that the chocolate mass has a content of vitamin E in the form of a tocotrienol-tocopherol mixture from natural sources (preferably with a higher tocotrienol fraction than tocopherol fraction), and in that, in the chocolate mass, the content of tocotrienols is greater than the content of tocopherols.

The combination of galactose with isomaltulose and/or tagatose and/or trehalose and/or ribose as sugar component and the tocotrienol-tocopherol mixture originating from natural sources with a higher tocotrienol fraction than tocopherol fraction lend the novel chocolate mass and the chocolate goods produced therefrom or therewith the advantageous property that, after consumption, it causes only a relatively low insulin output in the human metabolism and develops an inhibitory effect on the growth of cancerous ulcers, in particular of TKTL1-positive cancerous ulcers, without, at the same time, triggering cell-damaging effects in healthy cells.

The risk of developing type 2 diabetes, metabolic syndrome and also high blood pressure can be lowered by the consumption of chocolate goods that have been produced using the chocolate mass according to the invention. At the same time, the chocolate mass according to the invention and the chocolate goods produced therefrom are suitable as a component having a wide range of use in dietetic therapies for fighting cancerous ulcers, in particular TKTL1-positive tumors and/or metastases, wherein these dietetic therapies are based on the principle that carbohydrates which can be converted easily and quickly in the metabolism into glucose are drastically reduced and at the same time the fermentation metabolism in cancer cells is inhibited as a result of the intake of tocotrienols.

Unless stated otherwise, the following definitions apply in the present description and claims:

Chocolate mass=mixture of cocoa mass and sugar(s), which may additionally also contain cocoa butter and/or milk powder and/or other ingredients and is suitable for production of a chocolate good according to Annex 1 of the German Cocoa Regulation of 15 Dec. 2003 (Official Journal: BGB1. I p. 2738).

Cocoa mass=the cocoa seeds/cocoa beans freed from their shell and ground, which transition during the grinding process into broken cocoa seed (synonyms: broken cocoa, "nibs") and cocoa butter, wherein the cocoa butter envelopes the cocoa fragments and thus forms a liquid mass.

Sugar=sweet-tasting mono- di- and trisaccharides, such as sucrose, glucose, lactose, galactose, fructose, invert sugar, isomaltulose, maltose, melezitose, tagatose, trehalose, and ribose.

Sugar alcohols (synonym: alditols)=non-cyclic polyols, which are derived structurally by reduction of sugars, such as sorbitol, xylitol, mannitol, maltitol, isomaltol, and erythritol.

Content of tocotrienols=the content of alpha- and/or beta- and/or gamma- and/or delta-tocotrienol.

Unless stated otherwise, all ratios and percentages in the description and in the claims are consistently based on weight, the temperatures are given in degrees Celsius, and the pressures are given in bar with respect to ambient pressure.

Galactose is a sugar that, as a component of milk sugar (lactose), is a natural component of the human diet. Besides glucose and fructose, galactose belongs to those monosaccharides that are consumed most frequently by humans and are therefore supplied most frequently to the human metabolism. Galactose, as a component of carbohydrates, is required in various mucous membranes (anabolic reactions) and, as required, can also be used for catabolic reactions once converted to glucose.

In contrast to glucose, galactose is transported in the human body into the cells independently of insulin. The glycemic index (GI) of galactose at GI=20 is very low compared to sucrose (GI=65) and glucose (GI=100). By contrast, the sweetness of galactose is at least half as much as that of glucose or sucrose: based on sucrose, a 10% D-galactose solution has a sweetness of 63%.

Due to its suitability as a catabolic substrate, that is to say as a supplier of energy, galactose is particularly advantageous for patients who have an insulin resistance and in which there is an undersupply to the glucose-dependent nerve cells, in particular of the brain, in spite of a high blood sugar level—for example in patients suffering from Alzheimer's disease. By administering galactose or galactose-containing foodstuffs, such patients can be supplied with glucose indirectly in a manner independent of insulin (galactose is channeled into the nerve and brain cells in a manner independent of insulin via GluT-3 transporters, where it is converted into glucose). In principle, the intake of galactose in a healthy person also leads, at least in the long term, to higher muscular and cognitive ability.

Galactose itself causes only a relatively low insulin discharge, and thus promotes energy production by means of fat-burning indirectly, that is to say via the relatively low insulin level. In addition, hypoglycemic states and ravenous hunger attacks caused thereby are avoided as a result of the low insulin output. Galactose is therefore very well suited as a sugar component in the diet of individuals who have to control their weight or who have to lose excess weight.

In contrast to glucose and fructose, galactose occurs in nature only in small amounts as a monosaccharide. Galactose is conventionally consumed by humans almost exclusively in the form of the disaccharide lactose. Many adults however have a deficiency of the enzyme lactase, which cleaves lactose, and therefore suffer from lactose intolerance. For this reason, the foodstuff industry is increasingly dispensing with the use of lactose in foodstuffs. The fraction of galactose in the human diet is therefore also reduced.

Although galactose in the form of the free monosaccharide is digestible for humans with lactase deficiency, and although highly pure galactose is available in the prior art, the monosaccharide galactose has not previously been used in chocolate masses. One reason for this could lie in the fact that galactose is suspected of promoting radical formation in the cell and of triggering mitochondria dysfunction.

On the other hand, tests carried out by the Nobel prizewinner Otto Heinrich Warburg have shown that the fermentation metabolism of cancer cells (in cancer tissue sections) progresses most effectively with glucose as a food substrate, specifically at a rate of 23.9 consumed units per unit of time, whereas, with the substrate fructose, it progresses less effectively by a factor of 7 (rate 3.3), and, with galactose, progresses even less effectively by a factor of 18 (rate 1.3). This means: cancer cells provided only with galactose as a food substrate have a comparatively drastically reduced fermentation metabolism and as a result a correspondingly reduced growth rate and division rate. Galactose should therefore be a key sugar source in the diet of cancer patients.

A possible cell-damaging effect of the monosaccharide galactose is prevented or compensated for by the combined simultaneous intake of vitamin E in the form of a tocotrienol-tocopherol mixture from natural sources and of isomaltulose and/or tagatose. Vitamin E in the form of the alpha-tocopherol and also isomaltulose, or more correctly the fructose contained in this disaccharide, and also tagatose are known in the prior art for the fact that they very effectively suppress the formation of reactive oxygen species ("ROS") or what are known as oxygen radicals or neutralize produced oxygen radicals/ROS (Free Radic Biol Med. 1997; 22(1-2):257-268: Fructose and tagatose protect against oxidative cell injury by iron chelation; Diabetes. 1996 September; 45(9):1233-7. Abnormalities of retinal metabolism in diabetes or experimental galactosemia. III. Effects of antioxidants; Free Radic Res. 2000 January; 32(1):67-74. Diabetes-induced metabolic abnormalities in myocardium: effect of antioxidant therapy.)

The tocotrienol-tocopherol mixture also has the advantage that its tocotrienols, in particular the gamma-tocotrienol and the delta-tocotrienol, in accordance with earlier research results, act in various types of cancer as inhibitors of cell proliferation and as triggers of apoptosis and therefore have a direct anti-cancer effect (for example Pharmacology. 2010; 85(4):248-58; BMC Cancer. 2010 Mar. 8; 10:84; Breast Cancer Res Treat. 2010 Feb. 16).

In particular, palm oil and rice bran or tocopherol-tocotrienol extracts from palm oil and rice bran are possible sources for the tocotrienol-tocopherol mixture.

Besides its ROS-neutralizing effect, isomaltulose additionally has the advantageous property that, similarly to sucrose, it is a disaccharide formed from glucose and fructose, but in contrast to sucrose has just a glycemic index of GI=32 because the human disaccharidases in the small intestine cleave this disaccharide more slowly than the sucrose disaccharide, and the slow cleaving counteracts a rapid rise in blood glucose and insulin.

The reduced insulin discharge results in increased fat burning and increased activity of the mitochondria. Since isomaltulose is also poorly digested by the plaque bacteria in the mouth, isomaltulose belongs to the non-caries-producing sugar forms. The combination of isomaltulose with galactose, which is likewise friendlier to teeth than sucrose, lends the chocolate mass according to the invention the further advantage that it is also particularly suitable for children and teenagers, because teenagers and children prefer sweet chocolate and should also protect their teeth, which are still developing in part, against caries, particularly during this development phase.

Tagatose is a naturally occurring monosaccharide, which can also be produced from galactose by means of isomerization. Tagatose has a low glycemic index of GI=3 and a sweetness of approximately 97% based on sucrose, but has a much lower energy content than sucrose because it is digested directly by the human body only to an extent of approximately 20%. The remaining 80% of the tagatose are broken down by the intestinal flora, wherein butyrate is formed inter alia and has an inhibitory effect on the growth of cancer cells, can trigger apoptosis in cancer cells and controls the sugar metabolism in cancer cells (Int J. Cancer. 2010 Aug. 16. Butyrate elicits a metabolic switch in human colon cancer cells by targeting the pyruvate dehydrogenase complex.)

Trehalose is a natural tooth-friendly double sugar formed from two glucose molecules (alpha 1-1 bond). Its sweetness is approximately 50% of the sweetness of sucrose. The glycemic index of trehalose is approximately as high as that of isomaltulose (GI=32). Just like isomaltulose, trehalose is broken down first in the human small intestine and then causes a low insulin output. Trehalose is a non-reducing sugar and consequently does not react with free amino groups of amino acids, whereby foodstuffs containing trehalose are more stable. Since trehalose does not react with other foodstuff components, even with heating, due to its non-reducing properties, both these other foodstuff contents and trehalose itself are not chemically modified and are therefore available in unaltered biologically effective form. Trehalose is particularly well suited inter alia as a coating (coat), since it is hardly hygroscopic and therefore exerts a protective function at the surface. Since only glucose is released as trehalose is broken down, trehalose can also be used as a sweetening agent in the case of fructose intolerance. Trehalose lends foodstuffs a pleasant mouth sensation. In addition, trehalose suppresses flavors that are considered to be rather unpleasant by many individuals, such as a slightly bitter taste. This is accompanied by the advantage that health-promoting, yet unpleasantly tasting ingredients, such as secondary plant substances and tocotrienols can nevertheless be added in higher concentration to chocolate masses containing trehalose Ribose is present in all plant and animal cells. In the animal body D-ribose is used inter alia to form adenosine triphosphate (ATP), the most important energy supplier of the metabolism. In sporting circles, D-ribose is used as a dietary supplement in order to more quickly reproduce ATP consumed during muscle activity and to therefore reduce the regeneration phase between training units. D-ribose, similarly to galactose, is metabolized completely differently compared to sucrose and its intake does not cause a rise, but rather a reduction, of the blood sugar level. Ribose therefore even has a negative glycemic index because the blood sugar level is lowered after the consumption of ribose. This can be utilized in order to lower the glycemic index of the chocolate mass. The sweetness of ribose is approximately 30% of the sweetness of sucrose.

In addition to the aforementioned sugars, one or more sugar alcohols, in particular maltitol and/or isomaltol and/or erythritol, can be used. Here, the content of sugar alcohols should be lower than the content of sugars that are digestible completely by human enzymes. The sugar alcohols have the advantage that they have a high sweetness (isomaltol with the same sweetness as sucrose, but double the sweetness of isomaltulose), are not cariogenic, do not increase the blood sugar level, and do not trigger insulin discharge or only trigger extremely low insulin discharge. In addition, they excite intestinal activity and thus counteract constipation. Erythritol for example is a naturally fermented and tooth-friendly sugar replacement, having a sweetness of 50% to 60% based on the sweetness of sucrose. Erythritol is absorbed completely in the human small intestine and is released again in unaltered form via the kidneys, which is why its calorie value and glycemic index are 0. Due to the release of erythritol via the kidneys, the laxative effect is much lower in contrast to other sugar alcohols. A higher quantity of erythritol can therefore be ingested than is the case with other sugar alcohols. The coldness produced when melting erythritol can be utilized in the chocolate mass to reduce melting. In combination with peppermint oil for example, a chocolate product having a pleasant cooling effect in the mouth can thus also be produced.

In another variant, the sugars or the combination of sugars and sugar alcohols are combined with Stevia. Stevia (synonyms: sweetleaf, sweet leaf and sugar leaf) is the generally conventional abbreviated name for Stevia rebaudiana bertoni (genus: Stevien, family: asteraceae). The leaves of these plants contain the diterpene glycoside stevioside, which has up to 300 times the sweetness of sugar, protects the teeth against caries and does not influence the insulin level. The dried leaves or the industrially obtained sweet extracts are used for sweetening purposes.

The chocolate mass according to the invention may also additionally have a content of indigestible multiple sugars, in particular inulin or oligofructose and/or what are known as resistant starches (for example dextrins), which improve the senses and taste and simultaneously promote the growth of desirable intestinal bacteria (probiotic effect).

In a further variant, the chocolate mass additionally has a content of omega-3 fatty acids and/or medium-chain triglycerides ("MCTs"), whereby their health-promoting effect is further improved.

MCTs promote the provision of ketone bodies and of free medium-chain fatty acids, which both have an important role in the energy metabolism, in particular as an alternative energy source to blood sugar in cancer patients with increased activity of the TKTL1 gene in the energy metabolism of healthy tissue and also in individuals with insulin resistance in the energy metabolism particularly of the nerve cells in the brain (due to their ability to pass through the blood-brain bather).

The omega-3 fatty acids are preferably present in the form of oilseeds. "Oilseeds" are plant seeds that can be used to obtain vegetable oils. Oilseeds include, inter alia soya, rapeseed, hemp, flax and walnut. The seeds can be used in whole form or as oil meal. "Oil meal" denotes the by-products obtained besides the oil during the processing of oilseeds and oleiferous fruits. Depending on the processing method, oil meal is also referred to as press cake (when hot-pressing or cold-pressing the oilseeds) or extraction meal (with oil extraction by solvent). Oilseeds are characterized by a high content of essential unsaturated fatty acids and essential amino acids, and additionally also contain minerals, such as magnesium, selenium or zinc. A direct anti-cancer effect has been described for some oilseeds, and such oilseeds or the corresponding oils are therefore preferably used.

In accordance with the invention, medium-chain triglycerides are triglycerides having a preferred chain length of C8 and/or C10.

The chocolate mass may also have an additional content of secondary plant substances ("SPS") and may preferably contain one or more members of the following group: glucosinolates, carotenoids, lectins, flavonoids, phytosterols, polyphenols, in particular curcumin, ellagic acid, quercetin, resveratrol, delphinidin, diallyl sulfide, epigallocatechin-3-gallate, genistein, indol-3-carbinol, isoterpene, limonene, lycopene, OPC, salvestrol, and sulforaphane.

According to more recent findings, secondary plant substances have a significant efficacy, in particular in the case of chronic inflammation and mitochondrial damage and also in the case of oncological disorders. In order to achieve this effect, the secondary plant substances should not be administered or added to a foodstuff in isolated or nature-identical form, but should be taken or added to the foodstuff in the form of their natural source, such as seeds, fruits, or kernel or seed flours.

In a preferred embodiment, the chocolate mass additionally has a content of vitamin B1 in the form of the thiamine derivative benfotiamine. In contrast to thiamine, which is water-soluble, benfotiamine is fat-soluble and is therefore better suited as a vitamin B1 source in the fat-containing chocolate mass. Furthermore, benfotiamine is able to suppress ROS formation in cells and therefore counteracts a possible ROS formation by galactose (Diabetes Metab Res Rev. 2008 July-August; 24(5): 371-7—Benfotiamine exhibits direct antioxidative capacity and prevents induction of DNA damage in vitro). In addition, benfotiamine has much better biological efficacy than thiamine and causes an acceleration of degradation and conversion of the sugars contained in the chocolate and a reduction or avoidance of the negative effects of sugars (advanced glucose endproducts=AGE), in particular the chronic diabetes damages.

The chocolate mass may also have an additional content of $CO_2$-extracted seed oils (for example raspberry seed oil, kiwi seed oil, rose hip seed oil), which are rich in omega-3 fatty acids and simultaneously have a high proportion of valuable secondary plant substances. In contrast to the oils produced by means of conventional oil milling, $CO_2$ extracts have no metal particles from the mechanical abrasion of the oil milling process.

The chocolate mass may also have an additional content of vitamin D in order to prevent or counteract a vitamin D deficiency, since vitamin D deficiency promotes insulin resistance and metabolic syndrome, and in order to utilize the known strong anti-cancer effect of vitamin D.

In order to increase mitochondrial energy production and fat burning and to simultaneously inhibit the undesirable fermentation in cancer cells, the chocolate mass may additionally have a content of carnitine and/or creatine.

In principle, all conventional chocolate goods on the market can be produced using the chocolate mass according to the invention, in particular those goods according to Annex 1, nos. 3 to 10 and 2 (c) and 2 (d) of the German Cocoa Regulation of 15 Dec. 2003 (Official Journal: BGB1. I p. 2738), last amended by Article 2 of the Regulation of 30 Sep. 2008 (BGB1. I p. 1911).

In the case of chocolate goods that are produced in accordance with the original formulation with use of cereal flour and/or starch, for example those according to Annex 1 nos. 7, 8 and 9 of the Cocoa Regulation, gluten-free flours should be used, for example coconut flour, almond flour, pumpkin seed flour, grape seed flour, pomegranate seed flour, maize flour, rice flour, linseed flour, canihua flour, and sorghum flour. These gluten-free flours are mixed in this case such that the quantity of starch necessary and sufficient for an extrudate is obtained and, at the same time, a high protein and roughage fraction is achieved. The content of carbohydrates should be at most 40 weight-weight % and should comprise at least 20 weight-weight % of amylose-containing starch, and the content of protein should be at least 30 weight-weight %. The flours used should additionally also contain valuable secondary plant substances. The secondary plant substances, in particular polyphenols (for example from pomegranate seed flour or grape seed flour) support the ROS-suppressing effect of the tocopherol-tocotrienol mixture. At the same time, an inhibitory effect on the undesirable fermentation metabolism in cancer cells is exerted as a result of the secondary plant substances in the extrudates (Proteomics 2008, 8, 45-61 Transcriptome and proteome profiling of colon mucosa from quercetin fed F344 rats point to tumor preventive mechanisms, increased mitochondrial fatty acid degradation and decreased glycolysis). Due to the high quantity of protein and roughage contained in the extrudates, a chocolate good can be generated that has a higher protein and/or roughage fraction compared to conventional chocolate goods, without impairing the taste sensation. The higher quantity of protein and roughage additionally also reduces the rate of the digestion of the sugars contained in the chocolate good and thus reduces the rise in blood glucose and the output of insulin.

The chocolate mass according to the invention, in particular in the form of the chocolate goods produced therefrom, is very well suited in accordance with the invention as a foodstuff or dietary supplement in the preventative or therapeutic treatment of illnesses from the group comprising: celiac disease, type 2 diabetes mellitus, neurodegenerative diseases, in particular Alzheimer's disease, tumors, and illnesses that lead to cachexia (wasting syndrome), which accompany inflammatory processes or are caused thereby, in particular rheumatism, rheumatoid arthritis, inflammatory intestinal diseases such as ulcerative colitis and crohn's disease, and intestinal diseases such as leaky-gut syndrome (bowel hyperpermeability).

With the use according to the invention, individuals who are affected either by one of the aforementioned illnesses or who are at risk of developing such diseases, either genetically or as a result of diet, can receive therapeutic or preventative treatment.

The composition of the chocolate mass according to the invention is preferably based entirely on natural ingredients, which, in addition to the above-mentioned properties, also leads to improved tolerance and acceptance in the targeted public.

The chocolate mass according to the invention will be explained in greater detail hereinafter with reference to formulation examples.

In this case, the following definitions are used:

"Foodstuff extrudate"=conventional cereal extrudate or other foodstuff extrudate (for example protein-rich and roughage-rich, gluten-free extrudate with high fraction of secondary plant substances).

"Flakes"=cereal extrudates that can be produced by means of conventional standardized methods.

"Nut"=fruit with a hard wooden shell, which surrounds an oily, edible seed.

"Seed"=the solid inner part of a fruit.

Example 1: Chocolate Mass and Chocolate Snacks Produced Therefrom

Ingredients:

| (A) chocolate mass: | |
|---|---|
| cocoa mass | 39.2% |
| cocoa butter | 13.7% |
| galactose | 13% |
| isomaltulose | 34% |
| tocotrienol-tocopherol-mixture | 0.1% |
| (B) chocolate-snacks: | |
| chocolate mass according to (A) | 83% |
| foodstuff extrudate, for example soya flakes (protein-rich and roughage-rich, with pomegranate seed flour and grape seed flour) | 7% |
| soya lecithin | 0.8% |
| inulin | 8.2% |
| CO2-extracted raspberry seed oil (rich in omega-3 fatty acids) | 1% |

A cereal extrudate or foodstuff extrudate that has a content of carbohydrates of at most 40 weight-weight %, wherein the content of carbohydrates in the form of amylose-containing starch is at least 20 weight-weight %, that has a content of protein of at least 30 weight-weight %, and that is gluten-free is preferably used.

Instead of inulin, another prebiotic roughage or a combination of a number of such roughages can also be used.

Example 2: Variations of the Chocolate Snack According to Example 1

The ingredients according to (A) and (B) in example 1 are combined arbitrarily with nuts and/or oilseeds and/or fresh or dried fruits.

The nuts, oilseeds and fruits should have a low carbohydrate fraction in the overall product and should additionally naturally contain secondary plant substances, omega-3 fatty acids, and cancer-protective substances or health-promoting substances.

Preferred combinations of nuts and/or oilseeds and/or fresh or dried fruits are:

a) cranberry+pistachio
b) $CO_2$ extract from ginger+orange peel extract
c) walnut+roasted linseed wherein the fraction of (a), (b) or (c) in the chocolate snack is 5% in each case.

Example 3: Chocolate Mass and Chocolate Crisps Produced Therefrom With Cranberry and Pistachios Ingredients:

| (A) chocolate mass: | |
|---|---|
| cocoa mass | 39.2% |
| cocoa butter | 13.7% |
| isomaltulose | 35.8% |
| galactose | 11.3% |
| tocotrienol-tocopherol mixture | 0.01% |
| (B) chocolate crisps: | |
| chocolate mass according to (A) | 83.8% |
| inulin (= roughage from the chicory root) | 7.95% |
| foodstuff extrudates in crisp form | 2.5% |
| pistachios | 2.5% |
| cranberry | 2.5% |
| soya lecithin (as emulsifier) | 0.75% |

Other fruit seeds, in particular nuts or oilseeds, such as almonds, pumpkin seeds, pomegranate seeds, linseed, walnuts, macadamia nuts and pine kernels, can also be used instead of the pistachios.

Other dried fruits (for example apricots, mango, peach, apple, plum, cherry, orange, banana), in particular dried berries (for example chokeberry, blueberry, raspberry, blackcurrant, strawberry pieces), can be used equally instead of the cranberries.

The nuts, fruit seeds and dried fruits should have a low carbohydrate fraction in the overall product.

Example 4: Chocolate Mass and Chocolate Spread Produced Therefrom

Ingredients:

| (A) chocolate mass: | |
|---|---|
| cocoa mass | 54.85% |
| cocoa butter | 10% |
| galactose | 20% |
| isomaltulose | 10% |
| tagatose | 5% |
| tocotrienol-tocopherol mixture | 0.15% |
| (B) chocolate spread | |
| chocolate mass according to (A) | 30% |
| almond mass | 40% |
| MCT | 10% |
| omega-3 fatty acid source (for example linseed oil) | 20% |

In particular, linseed oil, hempseed oil, walnut oil, camelina oil, raspberry seed oil, rose hip seed oil, and kiwi seed oil are possible omega-3 fatty acid sources.

Example 5: Chocolate Mass and Roasted Almonds Coated Thereby

Ingredients:

| (A) chocolate mass: | |
|---|---|
| cocoa mass | 32% |
| cocoa butter | 15% |
| galactose | 9.92% |
| isomaltulose | 28% |
| tagatose | 15% |
| tocotrienol-tocopherol mixture | 0.08% |
| (B) chocolate almonds: | |
| chocolate mass according to (A) | |
| roasted almonds | |

Example 6: Chocolate Mass and Cereal Extrudate Balls Coated Thereby

Ingredients:

| (A) chocolate mass: | |
|---|---|
| cocoa mass | 52% |
| cocoa butter | 15.95% |
| galactose | 15% |
| isomaltulose | 10% |
| tagatose | 7% |
| tocotrienol-tocopherol mixture | 0.05% |
| (B) chocolate extrudate balls: | |
| chocolate mass according to (A) | 20% |
| foodstuff extrudates in ball form | 78% |
| gum arabic coating | 2% |

Example 7: "Chocolate Nut Cream"

Ingredients:

| (A) chocolate mass: | |
|---|---|
| cocoa mass | 25% |
| cocoa butter | 5% |
| galactose | 49.7% |
| tagatose | 20% |
| tocotrienol-tocopherol mixture | 0.3% |
| (B) chocolate spread | |
| chocolate mass according to (A) | 40% |
| almond mass | 40% |
| coconut oil | 20% |

Example 8: "One Shot Omega"—Liquid Chocolate Mass for Drinking

Ingredients:

| | |
|---|---|
| cocoa mass | 20% |
| cocoa butter | 2% |
| galactose | 5% |
| isomaltulose | 4% |
| tagatose | 3% |
| tocotrienol-tocopherol mixture | 1% |
| soya lecithin | 0.8% |
| linseed oil | 20% |
| walnut oil | 3.2% |
| raspberry seed oil | 12% |
| DHA oil from algae | 10% |
| grape seed oil | 9% |
| MCT | 10% |

Example 9: "Chocolate Mass Containing Milk"—Mixed Drink Made From Milk

Ingredients:

| | |
|---|---|
| cocoa mass | 6% |
| galactose | 4% |
| isomaltulose | 2% |
| tagatose | 3% |
| tocotrienol-tocopherol mixture | 0.1% |
| soya lecithin | 0.3% |
| thickening agent carrageen | 0.5% |
| raspberry seed oil | 0.5% |
| DHA oil from algae | 0.5% |
| MCT | 1% |
| milk, 3.5% fat content | 82.1% |
| vanillin flavoring | 0.001% |

Example 10: Chocolate Mass and Protein-Rich Crispy Chocolate Bar Produced Therefrom With Chokeberries Ingredients:

| (A) chocolate mass: | |
|---|---|
| cocoa mass | 27% |
| cocoa butter | 2.9% |
| galactose | 9% |
| isomaltulose | 8% |
| tagatose | 7% |
| tocotrienol-tocopherol mixture | 0.1% |
| lupin protein | 38% |
| crisps | 4% |
| chokeberries | 4% |

Example 11: Chocolate Mass and Chocolate Snacks Produced Therefrom, "Coconut" Flavor Ingredients:

| (A) chocolate mass: | |
|---|---|
| cocoa mass | 39.2% |
| cocoa butter | 13.7% |
| galactose | 13% |
| trehalose | 8% |
| isomaltulose | 21% |
| erythritol | 5% |
| tocotrienol-tocopherol mixture | 0.1% |
| (B) chocolate snacks: | |
| chocolate mass according to (A) | 83% |
| desiccated coconut | 8% |
| soya lecithin | 0.8% |
| inulin | 8.2% |

Example 12: Chocolate Mass and Chocolate Snacks Produced Therefrom, "Peppermint" Flavor Ingredients:

| (A) chocolate mass: | |
|---|---|
| cocoa mass | 39.2% |
| cocoa butter | 13.7% |
| galactose | 22% |
| isomaltulose | 20% |
| erythritol | 5% |
| tocotrienol-tocopherol mixture | 0.1% |
| (B) chocolate snacks: | |
| chocolate mass according to (A) | 90.5% |
| soya lecithin | 0.8% |
| inulin | 8.2% |
| CO2-extracted peppermint oil | 0.5% |

Example 13: Chocolate Mass and Chocolate Snacks Produced Therefrom, "Cinnamon" Flavor Ingredients:

| (A) chocolate mass: | |
|---|---|
| cocoa mass | 39.2% |
| cocoa butter | 13.7% |
| galactose | 22% |
| trehalose | 8% |
| isomaltulose | 17% |
| tocotrienol-tocopherol mixture | 0.1% |
| (B) chocolate snacks: | |
| chocolate mass according to (A) | 90.5% |
| soya lecithin | 0.8% |
| inulin | 8.2% |
| CO2-extracted cinnamon oil | 0.5% |

Example 14: Chocolate Mass and Chocolate Snacks Produced Therefrom, Post-Sport Regeneration, "Cinnamon" Flavor Ingredients:

| (A) chocolate mass: | |
|---|---|
| cocoa mass | 39.2% |
| cocoa butter | 13.7% |
| galactose | 22% |
| trehalose | 8% |
| isomaltulose | 14% |
| ribose | 3% |
| tocotrienol-tocopherol mixture | 0.1% |
| (B) chocolate snacks: | |
| chocolate mass according to (A) | 93% |
| soya lecithin | 0.8% |
| inulin | 0.2% |
| creatine | 3% |
| carnitine | 2.3% |
| benfotiamine | 0.2% |
| CO2-extracted cinnamon oil | 0.5% |

Example 15: Chocolate Mass and Chocolate Snacks Produced Therefrom for Regeneration and Biogenesis of the Mitochondria, "Lemon" Flavor Ingredients:

| (A) chocolate mass: | |
|---|---|
| cocoa mass | 39.2% |
| cocoa butter | 13.7% |

-continued

| | |
|---|---|
| galactose | 22% |
| trehalose | 8% |
| isomaltulose | 14% |
| ribose | 3% |
| tocotrienol-tocopherol mixture | 0.1% |
| (B) chocolate snacks: | |
| chocolate mass according to (A) | 91% |
| soya lecithin | 0.8% |
| inulin | 0.2% |
| creatine | 3% |
| carnitine | 2.3% |
| benfotiamine | 0.2% |
| flour (from leaf tips of cabbage types rich in quercetin) | 2% |
| CO2-extracted lemon oil | 0.5% |

The invention claimed is:

1. A chocolate mass comprising:
a cocoa mass,
a combination of sugars comprising at least:
i) galactose in form of a monosaccharide and wherein the galactose constitutes at least 10% of a total content of added sugars of the chocolate mass,
ii) tagatose and/or isomaltulose, and
iii) a tocotrienol-tocopherol mixture, wherein a ratio of tocotrienols to tocopherols in the tocotrienol-tocopherol mixture is greater than 1,
wherein
each of the sugars in the combination of sugars has a glycemic index of less than 35 (GI<35),
all of the sugars in the combination of sugars together have a glycemic index of less than 29 (GI<29), and
the chocolate mass has a glycemic index of less than 29 (GI<29),
wherein the tocotrienol-tocopherol mixture is provided in an amount effective to suppress formation of reactive oxygen species by the galactose.

2. The chocolate mass as claimed in claim 1, wherein the sugars comprise sugars fully digestible by human enzymes and the chocolate mass further comprises sugar alcohols, wherein a ratio of the sugar alcohols to the sugars fully digestible by human enzymes is lower than 1.

3. The chocolate mass as claimed in claim 1, wherein the chocolate mass is part of a chocolate good, wherein the chocolate mass is combined with a gluten-free foodstuff extrudate comprising at least 30 weight-weight % of protein and at most 40 weight-weight % carbohydrates, wherein said carbohydrates comprise at least 20 weight-weight % amylase-containing starch.

4. The chocolate mass as claimed in claim 1, further comprising indigestible multiple sugars or Stevia.

5. The chocolate mass as claimed in claim 1, further comprising omega-3 fatty acids and/or medium-chain triglycerides ("MCTs").

6. The chocolate mass as claimed in claim 1, further comprising secondary plant substances selected from the group consisting of: glucosinolates, carotenoids, lectins, flavonoids, phytosterols, polyphenols, in particular curcumin, ellagic acid, quercetin, resveratrol, delphinidin, diallyl sulfide, epigallocatechin-3-gallate, genistein, indol-3-carbinol, isoterpene, limonene, lycopene, OPC, salvestrol, sulforaphane and ubiquinone, and wherein the secondary plant substances are added via natural sources.

7. The chocolate mass as claimed in claim 1, further comprising CO$_2$-extracted flavors.

8. The chocolate mass as claimed in claim 1, further comprising thiamine (vitamin B1) derivative benfotiamine.

9. The chocolate mass as claimed claim 1, further comprising vitamin D.

10. The chocolate mass as claimed in claim 1, further comprising carnitine.

11. The chocolate mass as claimed in claim 1, further comprising creatine.

12. Chocolate goods comprising the chocolate mass as claimed in claim 1, wherein the chocolate mass is combined with a gluten-free foodstuff extrudate comprising:
at least 30 weight-weight % protein, and
at most 40 weight-weight % carbohydrates, wherein said carbohydrates are at least 2% flours from seeds and/or kernels that are rich in secondary plant substances.

13. A method for therapeutic treatment of illnesses, the method comprising:
providing the chocolate mass comprising
a cocoa mass,
sugars comprising:
galactose in form of a monosaccharide and wherein said galactose constitutes at least 10% of a total content of added sugars of the chocolate mass, tagatose and/or isomaltulose,
and a tocotrienol-tocopherol mixture, wherein a ratio of tocotrienols to tocopherols is greater than 1, wherein the tocotrienol-tocopherol mixture is provided in an amount effective to counteract formation of reactive oxygen species by the galactose, wherein each of the sugars has a glycemic index of less than 35 (GI<35), all of the sugars have a glycemic index of less than 29 (GI<29), and the chocolate mass has a glycemic index of less than 29 (GI<29); and
administering to an individual in need of the therapeutic treatment of illnesses said chocolate mass, wherein said illness is celiac disease, type 2 diabetes mellitus, neurodegenerative diseases, tumors, illnesses that lead to cachexia (wasting syndrome), wherein said illnesses accompany inflammatory processes or are caused thereby and intestinal diseases.

14. The method of claim 13, wherein the neurodegenerative diseases is Alzheimer's disease and/or wherein the illnesses that lead to cachexia, which are caused by inflammatory processes are rheumatism, rheumatoid arthritis, inflammatory intestinal diseases including ulcerative colitis and Crohn's disease, and/or the intestinal disease is leaky-gut syndrome (bowel hyperpermeability).

15. The method of claim 13, wherein the chocolate mass is part of a chocolate good, wherein the chocolate mass is combined with a gluten-free foodstuff extrudate comprising at least 30 weight-weight % of protein and at most 40 weight-weight % carbohydrates, wherein said carbohydrates comprise at least 20 weight-weight % amylase-containing starch and that contains at least 2% flours from seeds and/or kernels that are rich in secondary plant substances.

16. The chocolate mass as claimed in claim 2, wherein the sugar alcohols are isomaltol, maltitol and/or erythritol.

17. The chocolate mass as claimed in claim 4, wherein the indigestible multiple sugars are inulin, oligofructose or resistant starch.

18. The chocolate mass as claimed in claim 6, wherein the natural sources are seeds, fruits and kernel or seed flours.

19. The chocolate mass as claimed in claim 7, wherein CO$_2$-extracted flavors are flavors from raspberry and/or kiwi and/or rose hip and/or ginger.

20. The chocolate mass as claimed in claim 1, wherein the chocolate mass contains a fraction of lactose.

21. The chocolate mass of claim 1, further comprising isomaltulose in an amount effective to counteract formation of reactive oxygen species.

22. The chocolate mass as claimed in claim 1, wherein the sugars comprise the monosaccharide tagatose in an amount effective to counteract formation of reactive oxygen species.

23. The chocolate mass as claimed in claim 1, wherein the sugars further comprise ribose and/or lactose, with a ratio of the galactose to the lactose being greater than 1.

24. The chocolate mass as claimed in claim 1, wherein the galactose is obtained from cleaving lactose.

* * * * *